June 13, 1950 M. E. GLUHAREFF 2,511,502
TAILLESS AIRPLANE
Filed June 5, 1946 5 Sheets-Sheet 1
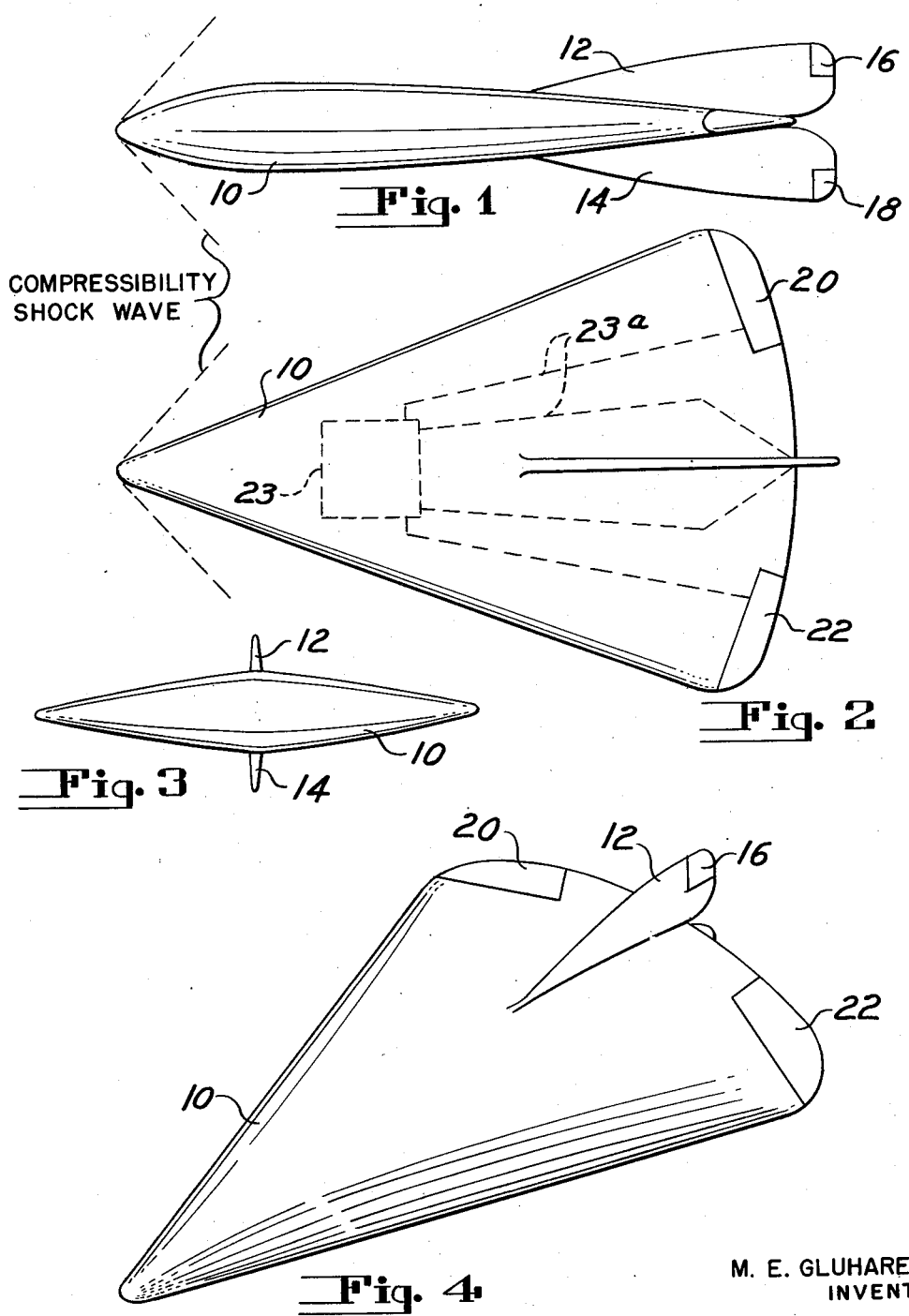
M. E. GLUHAREFF
INVENTOR
BY M. B. Tasker
ATTORNEY June 13, 1950  M. E. GLUHAREFF  2,511,502
TAILLESS AIRPLANE
Filed June 5, 1946  5 Sheets-Sheet 2
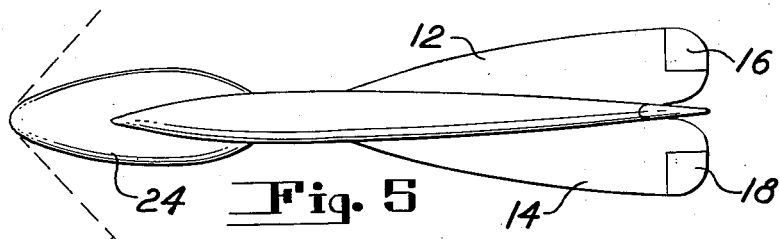
COMPRESSIBILITY SHOCK WAVE
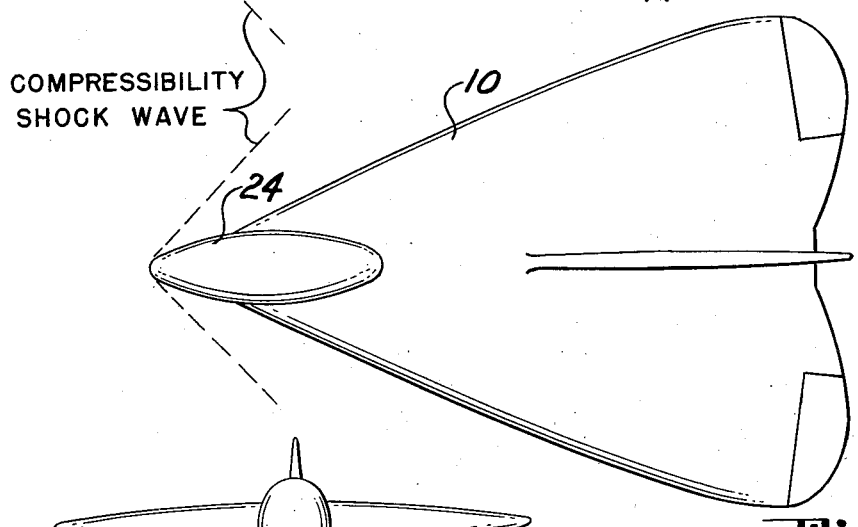
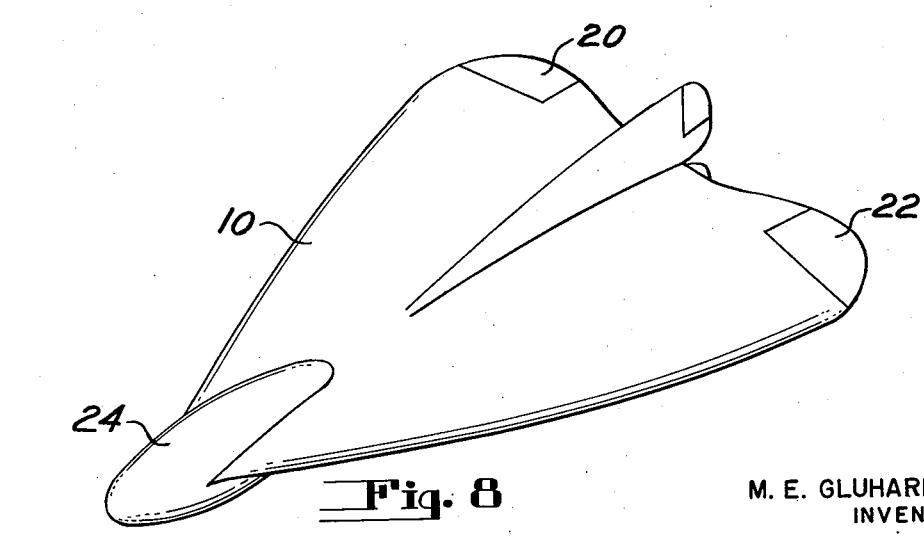
M. E. GLUHAREFF
INVENTOR
BY M. B. Tasker
ATTORNEY June 13, 1950  M. E. GLUHAREFF  2,511,502
TAILLESS AIRPLANE Filed June 5, 1946  5 Sheets-Sheet 3

COMPRESSIBILITY SHOCK WAVE

M. E. GLUHAREFF
INVENTOR

M. B. Tasker
BY  ATTORNEY

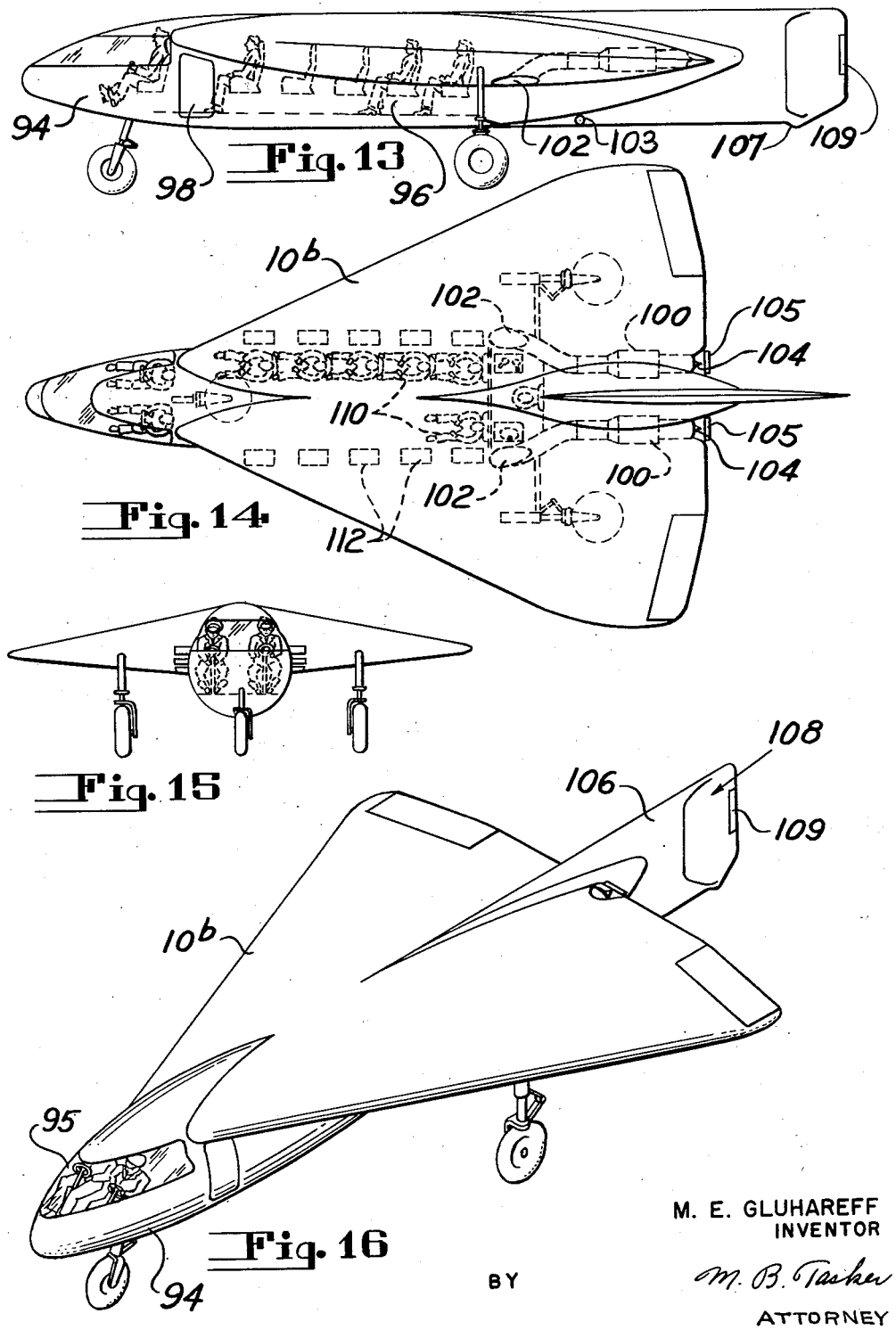

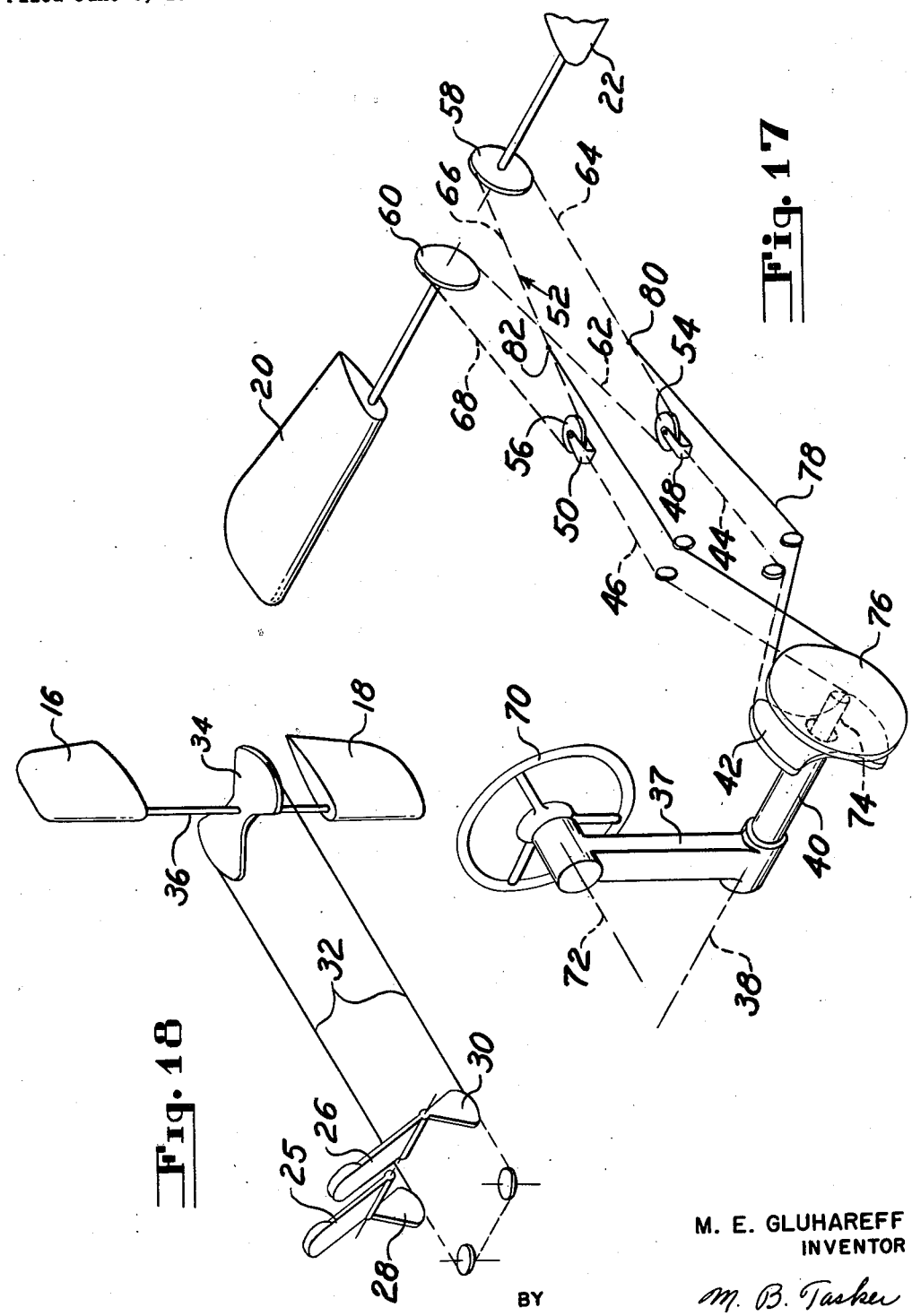

Patented June 13, 1950

2,511,502

UNITED STATES PATENT OFFICE 2,511,502

TAILLESS AIRPLANE

Michael E. Gluhareff, Bridgeport, Conn., assignor to United Aircraft Corporation, East Hartford, Conn., a corporation of Delaware Application June 5, 1946, Serial No. 674,491

10 Claims. (Cl. 244—13)

This invention relates to airplanes and particularly to airplanes capable of supersonic speeds.

It is well known that airplanes of conventional design have very definite limitations as to speed. The flow of air over the wing surfaces takes place smoothly as if the air were a non-compressible fluid up to a critical speed range approaching 85% of the speed of sound. Above this speed range the compressibility effect becomes very serious, resulting in greatly increased parasite drag and destructive vibration of the airplane as well.

It is an object of this invention to provide an airplane of simple structure which has low parasite drag and which is capable of operation at high Mach numbers without serious compressibility effects.

Another object of the invention is to provide a tailless airplane of very low aspect ratio having good flight characteristics from normal landing speeds up through the supersonic range to approximately twice the speed of sound; and more specifically to provide a dart-shaped airplane in which the wing leading edge is located well behind the compressibility shock wave coming off the nose of the airfoil so as to prevent disruption of the aerodynamic characteristics of the airfoil at sonic and supersonic speeds.

A further object of the invention is to provide an airplane capable of supersonic speed having high stability at low and cruising speeds and lower stability and hence greater maneuverability at high speeds.

A still further object of the invention is to provide an airplane comprising a single thin airfoil body of very low aspect ratio which is free from flutter or vibration at high speeds and having a sharply swept back leading edge and having its control surfaces located within the lateral limits of trailing wing tips. This shape may be modified to include a thickened body section to carry cargo, passengers, or a warhead.

These and other objects and advantages of the invention will be apparent from the following detailed description and the appended claims and from the accompanying drawings, in which Fig. 1 is a side view of an airplane or pilotless missile constructed in accordance with the invention;

Fig. 2 is a plan view of the airplane of Fig. 1;

Fig. 3 is a front view of the airplane;

Fig. 4 is a perspective view looking down on the airplane;

Fig. 5 is a side view of a modified form of the airplane;

Fig. 6 is a plan view of the airplane of Fig. 5;

Fig. 7 is a front view of the modified airplane;

Fig. 8 is a perspective view looking down on the modified airplane;

Fig. 13 is a side view of still another modification having a passenger carrying fuselage and jet propulsion engines;

Fig. 14 is a plan view of the airplane of Fig. 13;

Fig. 15 is a front view of the airplane;

Fig. 16 is a perspective view looking down on the airplane;

Fig. 17 is a diagrammatic illustration of the control mechanism for providing elevator and aileron control; and Fig. 18 is a similar view of the rudder control mechanism.

Figs. 1 to 4 show a dart-shaped airplane embodying the invention in the form of a pilotless missile the flight path of which may be controlled by radio or in any well-known manner usual in the art of guided missiles.

Figure 9:
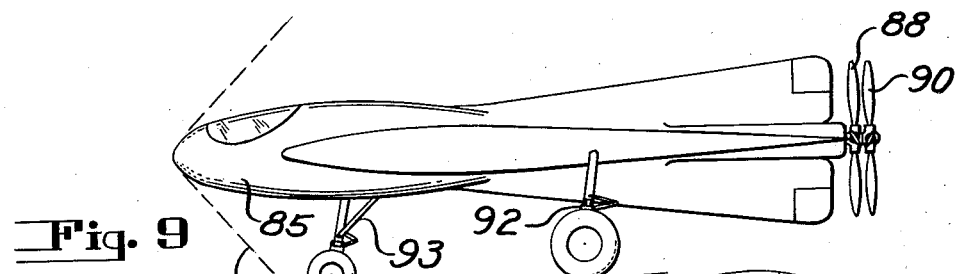
Fig. 9 is a side view of another modification equipped with engine-driven pusher type propellers and having a pilot compartment.

The body 10 of the airplane consists of a laminar flow or symmetrical ellipse airfoil section of triangular plan form providing an all-wing, tailless airplane of low aspect ratio. Aspect ratio may be defined as the square of the span divided by the total area of the wing and protruding fuselage. By low aspect ratio is meant an aspect ratio of less than 2. The preferred range of aspect ratio is between 1.2 and 1.3 and an aspect ratio of 1.27 has proved to be the most efficient at slow speed since at aspect ratios above or below this value the quotient of maximum lift coefficient divided by the minimum drag coefficient is sharply reduced on wings having isosceles triangular plan form. Wind tunnel tests run on scale models of the aircraft shown in Figs. 5–8 in which the aspect ratio could be varied indicate that reasonably high values of the airplane efficiency factor, i. e. 70% or over, are obtained between the aspect ratios of 1.2 and 1.33. Allowing for experimental error and the influence of fuselage projected area which may be taken into consideration, the critical range may well extend between 1.2 and 1.35. At aspect ratios below this range the airplane efficiency factor drops sharply. Further wind tunnel tests have shown that as the aspect ratio is increased beyond this range the slope of the pitching moment curve will reverse at low angles of attack. This means that at high speeds, such as in a dive, the airplane will be dangerously unstable. From this it is evident that high values of airplane efficiencies will allow slow speed flight characteristics in dart airplanes similar to aircraft of much higher aspect ratio without any of the high speed stability difficulties which are apparent in an aircraft having higher aspect ratio. As shown in Figs. 1 to 4 the leading edge of the wing is sharply swept back so as to lie well aft of the compressibility shock wave coming off the nose of the airfoil comprising the wing or protruding fuselage. The sweepback may be in some instances as great as 72.5° which is approximately the sweepback angle for a triangular plan form wing of 1.27 aspect ratio. Sweepback angle in this case is defined as the angle between the lateral axis of the aircraft and the leading edge of the wing. The compressibility shock wave referred to is actually a cone of revolution. When the airfoil is operating in the center of this cone, the lift distribution is then unaffected by the compressing of the air in front of the airfoil either below or above the speed of sound up to 1200 to 1300 miles per hour. Although the velocity of the airstream may be supersonic, the pattern of the flow is subsonic in this condition. The airfoil used may be one of symmetrical elliptical section so that the acceleration of the airstream takes place only at the nose, and then a substantially constant velocity of air flow is maintained to the faired-in trailing edge. On conventional airfoils the airstream has a tendency to accelerate near the point of maximum thickness. The development of the lift by the triangular plan form of the wing is dependent on the expansion of the span of sections in the downstream direction. By "span section" is meant a cross section through the wing in a plane taken at right angles to the fore and aft center line of the aircraft. The airfoil must end abruptly behind the section of greatest width as the sections aft of this point will develop no lift. Vortex sheets are formed on both sides of the longitudinal axis at the points of maximum span. These sheets curl inward and downward giving a negative velocity over the whole area aft of maximum span.

Centrally located symmetrical upper and lower fixed stabilizer fins 12 and 14 are provided which extend from substantially the trailing edge of the wing well forward into the wing where they merge smoothly into the upper and lower surfaces of the wing. Rudders 16 and 18 are provided at the trailing edges of the fins 12 and 14 and extend well aft of the trailing edge of the wing, and are mounted as far above and below the horizontal center line of the aircraft as possible so as not to interfere aerodynamically with the wing. This arrangement of the fins and rudders insures that they will be effective at low speeds and high angles of attack as when approaching for a landing. Thus at high angles of trim, as when landing, the upper fin and rudder will not be blanketed by the wing.

Longitudinal and lateral control is provided by wing tip surfaces 20 and 22 disposed on opposite sides of rudders 16 and 18 and projecting outboard and forwardly along the trailing edge of the wing so as not to deflect the airstream into the rudders or fins. These surfaces should be located behind the point of maximum span so that they will operate in the vortex flow. In this manner control is always available at slow speeds. At high speeds the control surfaces or "elevons" will work in the conventional aerodynamic way because the tip vortices are small and are carried away by the airstream. However, at slow speeds and at higher angles of attack the "elevons" are working in the vortex flow and utilizing the vortex energy. It is for this reason they are located outboard of the centerline of the ship and aft of the maximum span. In general, due to the plan form, the vortices act as end plates allowing a two dimensional flow over the central portion of the wing unobstructed by control surfaces. Consequently, high lift co-efficients of approximately 1.95 have been experienced at high angles of trim, and have produced correspondingly low landing speeds. The horizontal control surfaces 20 and 22 are adapted to be moved identically above and below the horizontal medial plane of the wing to provide elevator control, or to be operated differentially to provide aileron control, or in any combination of the two movements. In the guided missile shown in Figs. 1 to 4, the control of the rudders 16, 18 and the horizontal control surfaces 20, 22 may be effected by radio control mechanism indicated at 23 and suitable control cables 23a.

In Figs. 5 to 8 there is shown a somewhat similar form of guided missile except that the leading edge of the airfoil body in the vicinity of the longitudinal axis is provided with a forwardly projecting bulged airfoil body portion 24 of airfoil cross-section which is well pointed at its forward end and which merges aft into the main wing airfoil 10. This body 24 may house the control apparatus or in some instances may carry the explosive charge of the missile. The body portion 24 also serves to further displace the compressibility shock wave in a forward direction so as to maintain the leading edge of the wing well aft of the shock wave.

A pilot operated control mechanism for the rudders 16 and 18, as shown diagrammatically in Fig. 18, may be provided where the airplane has provisions for a pilot and includes the usual rudder pedals 25 and 26 having cable sectors 28 and 30 over which runs a rudder control cable 32 connected thereto. The cable 32 is also connected to a cable sector 34 movable about the vertical rudder axis 36 and to which both rudders 16 and 18 are fixed so that these rudders move in unison.

The control mechanism for the "elevon" surfaces 20 and 22 is shown in Fig. 17. Here a control column 37 is mounted for fore and aft movement about a horizontal axis 38 of a horizontal control member 40 in the form of a hollow tube. The member 40 carries a cable sector 42 which is connected by cable portions 44 and 46 with cable blocks 48 and 50. A single cable 52 is passed through the pulleys 54 and 56 of cable blocks 48 and 50 and over the cable pulleys 58 and 60 fixed to the "elevons" 20 and 22, the cable portions 62, 64 from pulley 54 passing beneath the cable pulleys 60 and 58, while the cable portions 66 and 68 from pulley 56 pass over these pulleys. With this arrangement of cable 52 the fore and aft movements of control column 37 result in identical down and up movements of "elevons" 20 and 22. Rotation of the wheel 70 on control column 37 about the axis 72 causes the rotation of the horizontal control shaft 74 which extends within the tubular shaft 40, suitable bevel gear connections being provided between the wheel axle and this shaft. The shaft 74 carries a cable pulley 76 over which runs a cable 78, the opposite ends of which are connected to cable 52 at points 80 and 82. It will be evident that upon the rotation of the wheel 70 in opposite directions opposite differential operation of the "elevons" 20 and 22 will result.

The pattern of airflow about airfoil 10 is always subsonic when viewed in cross-sections perpendicular to its longitudinal axis. With the very low aspect ratio shown, due to the extreme sweepback, the airplane is enabled to operate at supersonic speeds without serious compressibility effects since the swept back leading edge of the wing always lies well aft of the compressibility shock wave. For instance at 820 M. P. H. the compressibility cone will have an included angle of 165°; at 870 M. P. H., 145°; at 925 M. P. H., 131°; at 1180 M. P. H., 94° so that an airfoil would have to be swept back well beyond this included angle to be out of the range of the shock disturbance at supersonic velocities. Furthermore, the location of the control surfaces of the airplane is such that there are no parts other than the rigid mass in the vicinity of the shock wave and hence no parts which can vibrate or flutter. Thus the airplanes shown in Figs. 1 to 8, principally as a result of the extreme sweepback on the wings, are enabled to operate at very high Mach numbers with complete absence of the compressibility problems which have confronted the conventional airplane. Further the dart wing design of these figures offers the advantage of low parasite drag which is essential for supersonic flight.

Figure 10:
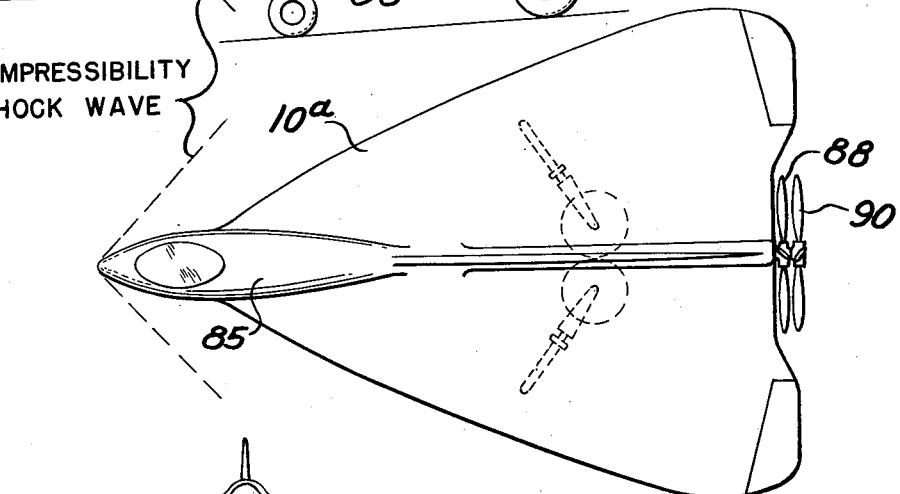
Fig. 10 is a plan view of the airplane of Fig. 9.
Figure 11:
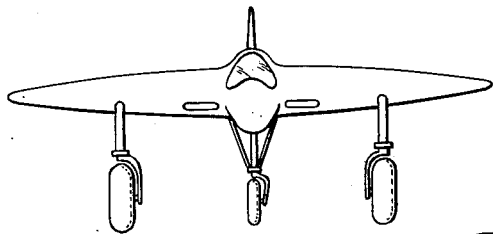
Fig. 11 is a front view.
Figure 12:
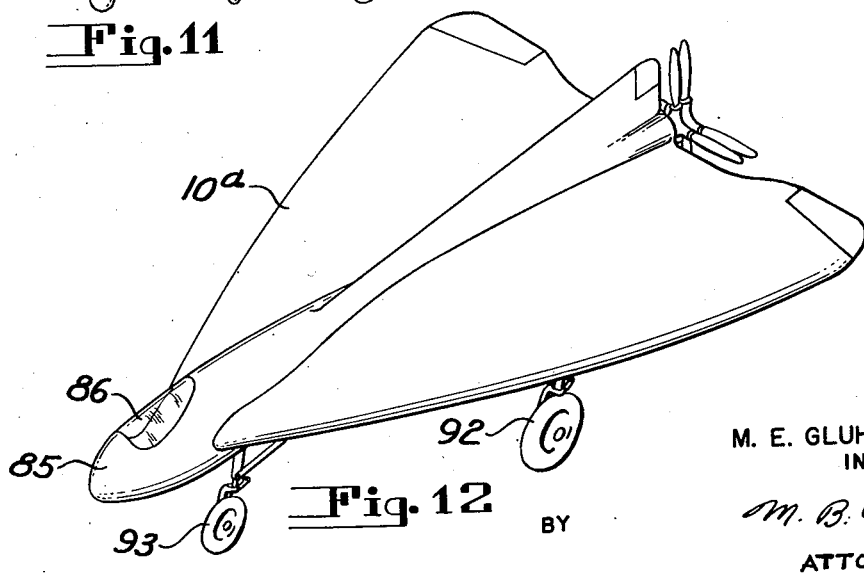
Fig. 12 is a perspective view looking down on the airplane of Fig. 9.

Figs. 9 to 12 show another modification of the airplane in which a forwardly protruding airfoil body portion 85 is provided similar to portion 24 in Figs. 5 to 8 but which extends further aft in the wing 10a to provide a pilot compartment 86. It has been found that the flight characteristics of dart airplanes are improved by constructing the leading edge of the wing on a faired convex curve in plan inasmuch as airflow along the leading edge of the wing tends to follow a curved pattern in plan and such a curved leading edge more nearly follows this airflow pattern. Therefore the somewhat convex leading edge approaches the more efficient elliptical spanwise distribution of lift. In these figures a power plant (not shown) is also provided which is submerged in the airfoil portion 85 and two counter-rotating pusher type propellers 88 and 90 are provided at the trailing edge of the main wing 10a. Also in the airplane of Figs. 9 to 12 suitable tricycle retractible landing gear 92, 93 is shown which was omitted from the missiles shown in Figs. 1 to 8.

Figs. 13 to 16 show still another form of the invention in which the dart-shaped wing 10b retains the previously described dart shape but is of sufficient size to provide passenger space in the protruding airfoil body portion 94 which in this form of the invention is of sufficient cross-sectional area to provide not only a pilot compartment 95 in the forward end thereof but also a passenger compartment, or cabin, 96 with a door 98. Axial flow jet engines 100 are provided on opposite sides of the longitudinal centerline of the plane having ram air inlet openings 102 beneath the main wing 10b and in the immediate vicinity aft of the thickest portion of the wing as it has been found that at this point maximum ram effect may be obtained for the jet engines with a minimum increase of drag due to turbulence around the air intakes at high Mach numbers. The engines also have jet discharge orifices 104 on opposite sides of a fin 106 carrying a single rudder 108 and control tab 109. Due to the position of these control surfaces located near the jet blasts they are constructed of stainless steel or other suitable heat resisting materials. A control tab 105 of carbon is located in the jet blast for positive trimming. The fin 106 extends forwardly of the trailing edge and merges into the upper and lower wing surfaces. It also extends far enough aft of the trailing edge of the wing so as not to be blanketed by the wing at high angles of trim and carries tail skid 107. The fin 106 may be pivoted at any desired location such as 103 so that upon coming in contact with the ground at high angles of attack of the wing, such as upon landing, it will be automatically deflected out of the way so that an excessively long landing gear is not necessary.

The cabin 96 is of sufficient dimensions to provide two rows of seats 110 and, since lateral windows are impossible due to the design of the wing, a row of windows 112 are provided in the bottom wing surface alongside and outboard of each row of passenger seats 110. It will be evident that the dart-shaped plan form of the airplane shown in Figs. 13 to 16, like those forms previously described, is specially adapted for supersonic flight to which jet propulsion is also well suited.

It will be evident that as a result of this invention an airplane has been provided having low parasite drag in and through the sonic range of velocities and, due to the dart-shaped form of the airplane resulting from the sharp sweepback of the wing, one which is capable of operation at supersonic speeds.

It will further be evident that as a result of the invention an airplane has been provided capable of sonic and supersonic speed and one which has good stability at low and cruising speed and somewhat less stability and hence better maneuverability at high speeds. It will also be evident that, by reason of the dart-shaped form of the airplane and the location of the control surfaces at the trailing wing tips, an airplane has been provided which is capable of high speed flight without danger of flutter and vibration of the wing or wing tips. Also control mechanism has been provided by which identical movement or differential movement of the "elevons" at the trailing wing tips can be provided by two simple movements of the control member; or a combined movement of these surfaces can be obtained if desired.

While several embodiments of the invention have been disclosed herein, it will be evident that numerous changes in the construction and arrangement of the parts are possible without departing from the spirit and the scope of the appended claims.

What it is desired to secure by Letters Patent is:

1. An airplane of isosceles triangular plan form having an aspect ratio between 1.2 and 1.35, and having the span sections thereof progressively increasing in thickness from the acute angled nose of the airplane aft to a point substantially midway of the maximum chord and having a maximum span equal to approximately 64% of said maximum chord.

2. An airplane of isosceles triangular plan form having its span sections progressively increasing in dimension from the acute angled nose of the airplane aft substantially to the trailing edge and having its maximum span section equal to approximately 64% of its maximum chord.

3. A tailless airplane having a main dart-shaped sustaining surface of symmetrical airfoil section, said surface having its forwardly converging leading edges swept back at least 65° and having an aspect ratio of substantially 1.27.

4. A tailless airplane including a main sustaining wing of symmetrical airfoil section and generally triangular plan form having upper and lower cambered surfaces tapering to the leading and trailing edges of said wing, said wing having a sweepback angle of approximately 72° and an aspect ratio of approximately 1.3, fixed stabilizing fin means projecting above and below said upper and lower surfaces of said wing and extending forward of the trailing edge of said wing and faired into said upper and lower wing surfaces, trailing rudder means pivotally mounted on said fin means aft of the trailing edge of said wing, and horizontal control surfaces pivoted to the trailing edge of said wing adjacent the tips thereof on opposite sides of and laterally spaced from said fin means for controlling both the vertical and rolling movements of the airplane, each of said surfaces being within the outboard half of the semi-span of said wing.

5. A tailless airplane of triangular plan form having two equal sides forming the leading edges of the wing and merging into the nose of the airplane, said wing having a sweepback angle of approximately 72° and an aspect ratio of approximately 1.3, vertical stabilizing fins above and below the wing extended forward from the trailing edge and faired into the top and bottom wing surfaces and extending a substantial distance aft of the trailing edge of said wing, rudders pivotally mounted on the rear extremities of said fins laterally remote from said wing surfaces, and horizontal control surfaces pivoted to the trailing edge of said wing at the outboard tips thereof and having their inboard ends terminating remote from said rudders for controlling both the vertical and rolling movements of the airplane.

6. A tailless airplane of generally triangular plan form having two equal sides forming the leading edges of the wing, a streamlined cabin faired into said wing and projecting ahead of said wing, vertical stabilizing fins above and below the wing extended forward from the trailing edge and faired into the top and bottom wing surfaces aft of said cabin and extending well aft of the trailing edge of said wing, a pair of rudders forming the rearmost extremities of said fins, two horizontal control surfaces pivoted to the trailing edge of said wing aft of its maximum span on opposite sides of and laterally remote from said fins for controlling the vertical and rolling movements of the airplane, each of said surfaces being located within the outboard half-span of said wing, and control means in said cabin for controlling the operation of said horizontal surfaces either identically to provide elevator action or differentially to provide aileron action, and linkage means connecting said control means and said horizontal surfaces.

7. A tailless airplane of isosceles triangular plan form having the two equilateral sides forming the leading edges of a main sustaining wing, a nose portion of airfoil cross-section in the longitudinal centerline of said wing extending forward of the intersections of said leading edges, said wing having an included angle between said leading edges less than the angle of the shock wave set up by said nose at the maximum speed of the airplane, fixed fin means in the longitudinal centerline of said wing faired into said wing and extending above and below the top and bottom surfaces thereof, said fin means having portions located well aft of the trailing edge of said wing, rudder means pivotally mounted on said aft portions of said fin means, and horizontal control surfaces pivotally mounted on the trailing edges of said wing at the lateral extremities thereof and having their inboard ends terminating laterally remote from said fin means.

8. The combination claimed in claim 7 in which the fin means on the upper and lower wing surfaces which extend aft and outboard of the wing comprise a single surface, and a single rudder is provided at the aft end of said single surface.

9. A tailless airplane of generally triangular plan form having two forwardly converging sides forming the leading edges of a main sustaining wing, a nose of airfoil section merged into said wing at the apex of said leading edges and protruding forwardly thereof, said wing having an aspect ratio between 1.2 and 1.35, and said leading edges each having a faired convex curve in plan which is continuous from said nose to the trailing edge of said wing.

10. A wing for an airplane of generally isosceles triangular plan form having an aspect ratio between 1.2 and 1.35, said wing having the span sections thereof progressively increasing in dimension in an aft direction and having its maximum span approximately at its trailing edge.

MICHAEL E. GLUHAREFF.

REFERENCES CITED

The following references are of record in the file of this patent:

UNITED STATES PATENTS

| Number | Name | Date |
|---|---|---|
| D. 133,670 | Metz | Sept. 1, 1942 |
| D. 142,293 | Arbib | Aug. 28, 1945 |
| D. 143,706 | Bowers | Feb. 5, 1946 |
| D. 143,866 | Northrop | Feb. 12, 1946 |
| 710,266 | Gibon | Sept. 30, 1902 |
| 730,107 | Gibon | June 2, 1903 |
| 1,600,671 | Hill | Sept. 21, 1926 |
| 1,865,964 | Rohrbach | July 5, 1932 |
| 2,160,281 | Price | May 30, 1939 |
| 2,412,646 | Northrop | Dec. 17, 1946 |
| 2,431,592 | Stalker | Nov. 25, 1947 |

FOREIGN PATENTS

| Number | Country | Date |
|---|---|---|
| 2,115 | Great Britain | of 1867 |
| 333,526 | Italy | Dec. 31, 1935 |
| 385,310 | France | Mar. 9, 1908 |
| 500,126 | France | Dec. 8, 1919 |
| 671,210 | France | Aug. 31, 1929 |
| 675,448 | France | Nov. 7, 1929 |

OTHER REFERENCES

"Flight," of November 4, 1937, page 450.
"Flight Magazine," December 14, 1944, page 631.